April 14, 1970     H. MILLER     3,505,912

CLUTCH MECHANISM

Filed Sept. 26, 1968     3 Sheets-Sheet 1

INVENTOR
HARRY MILLER
BY
ATTORNEY

April 14, 1970     H. MILLER     3,505,912

CLUTCH MECHANISM

Filed Sept. 26, 1968     3 Sheets-Sheet 2

INVENTOR
HARRY MILLER
BY
S. C. Yeaton
ATTORNEY

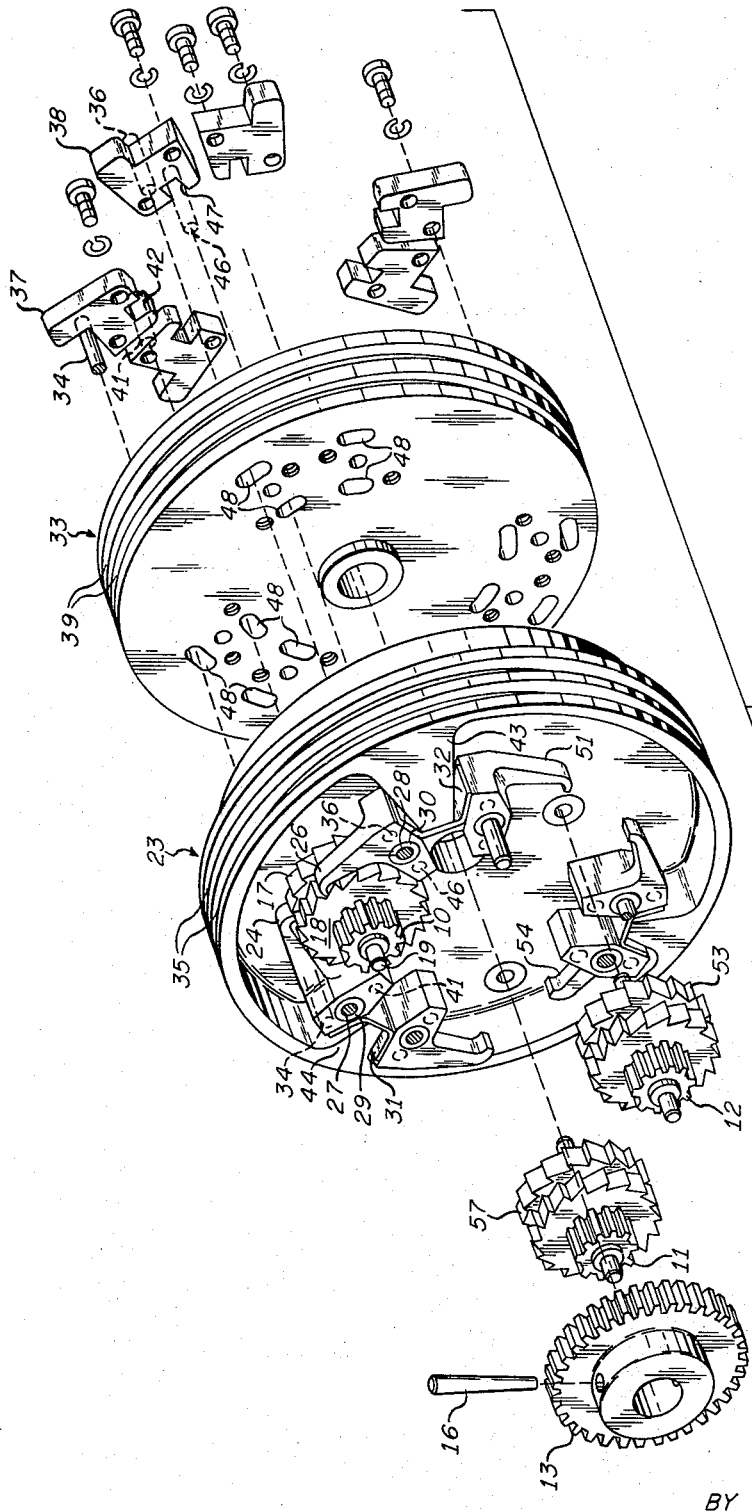

United States Patent Office 3,505,912
Patented Apr. 14, 1970

3,505,912
CLUTCH MECHANISM
Harry Miller, Scottsdale, Ariz., assignor to Sperry Rand
Corporation, a corporation of Delaware
Filed Sept. 26, 1968, Ser. No. 762,831
Int. Cl. F16h 5/10
U.S. Cl. 74—626                           9 Claims

ABSTRACT OF THE DISCLOSURE

A clutch apparatus having a first drive member disengageably connected to an output member by means of a sun and planet gear arrangement coacting with contradirectionally operative ratchet mechanisms for driving both the output member and a second input member when coupled thereto, the second drive member being operative to actuate the ratchet mechanisms so as to disengage the first drive member and independently control the position of the output member.

BACKGROUND OF THE INVENTION

The present invention relates to clutch mechanisms and particularly to clutches suitable for use in dual control systems wherein a first drive member is operative to control the position of both an output member and a second drive member until such time as the second drive member is actuated to disengage the first drive member and provide independent overriding control of the output member. The dual control clutch mechanism of the present invention is also adaptable to systems in which a single disengageable drive member is coupled to a plurality of such clutches, each of which has an individual overriding drive member for adjusting the position of its respective output member. One example of a system of this type is an automatic throttle controller for a multi-engine aircraft wherein the output members of the respective clutches connect to the throttle actuators of the individual engines and the disengageable drive member connects to the output shaft of a servo in the throttle control apparatus. The overriding drive member on each clutch is adapted for manual adjustment in order to provide separate control of the individual engines while the other engines remain under automatic control. A prior art clutch mechanism having the foregoing characteristics is disclosed in U.S. Patent 2,394,384 issued to B. G. Horstmann on Feb. 5, 1946 and assigned to The Sperry Gyroscope Company, Ltd.

Heretofore, dual control clutches have generally been designed with the output member connected to the disengageable drive member by means of balls or toggles which can be moved in and out of jamming engagement with appropriately contoured camming surfaces. This kind of action is not particularly desirable, however, because large forces are transmitted through the components of the disengaging mechanism resulting in substantial mechanical wear and increased backlash. In addition, the prior art clutches have been relatively large since the resolution of the clutch is related to its size. It is, of course, possible to obtain high resolution with small components but this makes them more difficult to manufacture and, more importantly, reduces their ruggedness and reliability. In any event, it has usually been necessary, in the case of aircraft controls, to mount the clutches at a location remote from the cockpit, thereby requiring the use of additional error producing cables or linkages for coupling between the clutch and control devices.

SUMMARY OF THE INVENTION

In the present invention the means normally connecting the disengageable drive member to the output and override drive members comprises a sun and planet gear arrangement operating in combination with a plurality of ratchet mechanisms, each comprising a pawl and ratchet wheel. Several planetary gears are used, as will be explained subsequently, to improve the resolution of the clutch mechanism but other features and advantages of the invention are inherent in the individual planetary gears and their mating ratchet assemblies. For instance, since the disengageable drive member is held in the coupled position by engagement between one of the pawls and its corresponding ratchet wheel, non-jamming action is provided, thereby decreasing not only the backlash and mechanical wear but also the force required to actuate the override drive member. In addition, the mechanical advantage provided by the gears decreases the forces transmitted through the ratchet mechanism and further, the clutch size can be reduced since the combination of the ratchets and gears is able to provide equivalent resolution in a substantially smaller package than one using only ratchets or jam-type elements.

In a preferred embodiment of the invention, three planetary gears are equiangularly disposed about a sun gear pinned to an input drive shaft. Each planetary gear is fixedly mounted together with a pair of contradirectionally operative ratchet wheels, on a shaft supported at each end in bushings in an output drum. Each ratchet wheel has a corresponding pawl which is also mounted on a shaft supported in the output drum. Coupling between the output drum and the input drum is provided by pins attached to each pawl and extending through slots in the input and output drum into proximate relationship with stops secured to the input drum. When the pawls are in contact with the ratchet wheels, the planetary gears are precluded from rotating relative to the output drum. Under this condition, the input drive shaft is coupled to the output drum which in turn is coupled to the input drum by means of the pins attached to the pawl. Thus, rotation of the input shaft produces a corresponding rotation of both the input and output drums. On the other hand, when the input drum is independently rotated, the stops therein move into contact with the pawl pins causing the pawls to pivot about their mounting shafts and thereby become disengaged from the ratchet wheels. Now, the planetary gears are able to rotate relative to the output drum and as a result the input drive shaft is no longer coupled to either the input or output drum. The input drum, however, remains coupled to the output drum and drives it by forcing the pawls against stops affixed thereto.

To increase the resolution of the clutch, the ratchet mechanisms are arranged such that the pawls of each ratchet pair are in slightly different engagement with their respective ratchet wheels at any given instant. This will be explained more fully in the following description of the preferred embodiment.

BRIEF DESCRIPTION OF THE DRAWINGS

FIG. 3 is a perspective schematic depicting the details of the ratchet mechanisms and the interconnections between the input and output drums of the embodiment of FIG. 1.

DESCRIPTION OF THE PREFERRED EMBODIMENT

Figure 1:
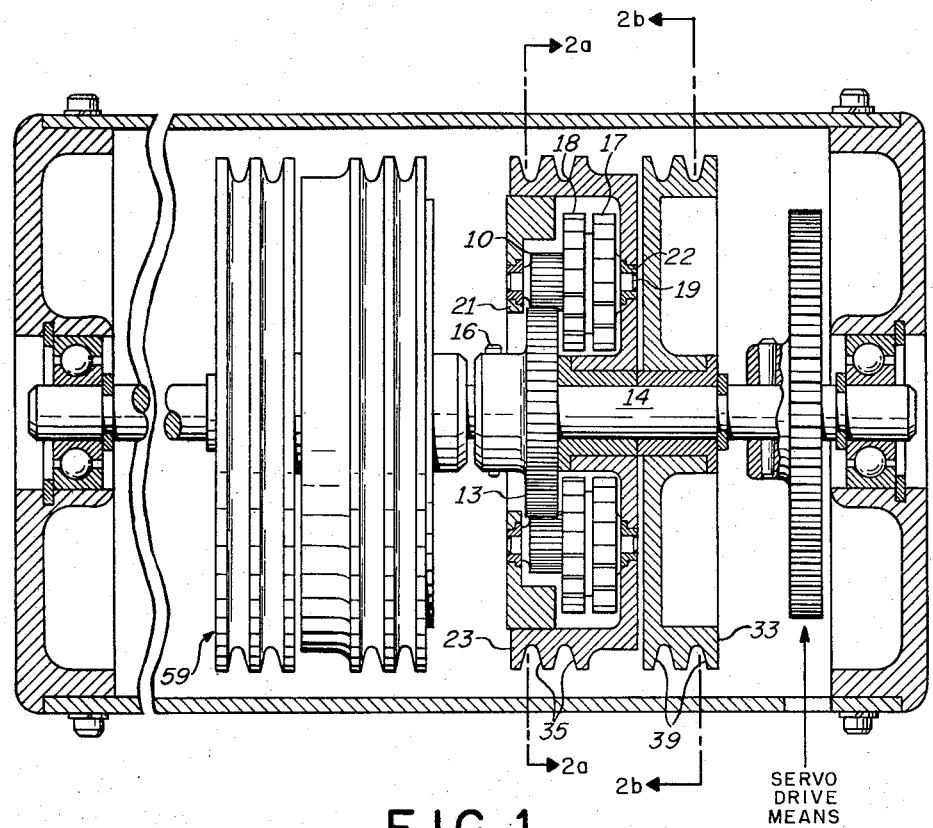
FIG. 1 is a longitudinal sectional view of a preferred embodiment of the invention.
Figure 2A:
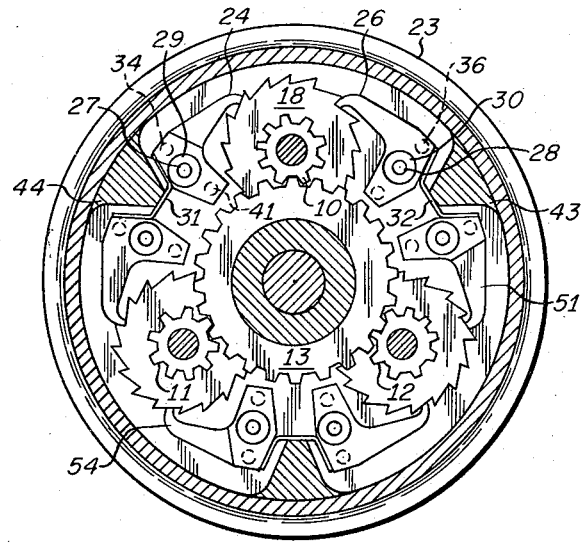
FIGS. 2a and 2b are cross-sectional views taken at the designated positions in FIG. 1.
Figure 2B:
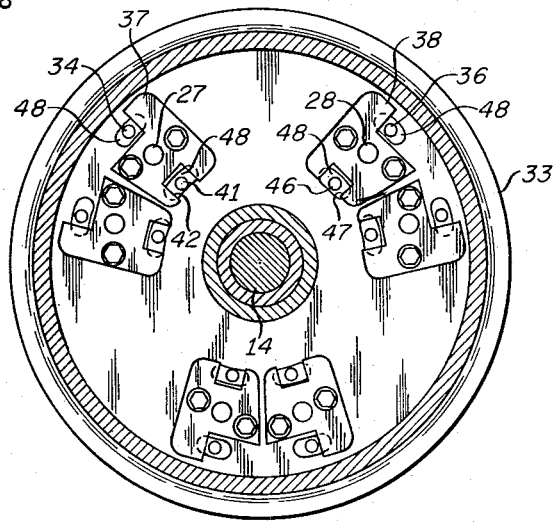

Referring to FIGS. 1-3, planetary gears 10, 11 and 12 mesh with sun gear 13 secured to rotary input drive shaft 14 by shear pin 16. The three planet gears each operate in conjunction with a ratchet mechanism comprising a pair of ratchet wheels and associated pawls. Since the three gear and ratchet assemblies are substantially identical in construction and operation, except for slight variations that are discussed later, only one will be described in detail. Specifically, gear 10 and ratchet wheels 17 and 18 are rigidly mounted on shaft 19 supported at each end in bushings 21 and 22 in output drum 23 which is rotatably mounted on shaft 14. Pawls 24 and 26, positioned to engage with ratchet wheels 17 and 18, are supported on shafts 27 and 28 running through bushings 29 and 30, respectively, into the end walls of output drum 23. The pawls are constrained by leaf springs 31 and 32 so as to be normally in contact with their mating ratchet wheels. Thus, planetary gear 10 is able to rotate in either direction about its support shaft 19 whereupon input shaft 14 is coupled to output drum 23, ratchet wheel 17 operating in conjunction with pawl 24 to hold planet gear 10 stationary for rotation of the input shaft in one direction while ratchet wheel 18 is operative with pawl 26 for oppositely directed rotation. Hence, coupling between the input shaft and output drum is provided by the latching contact between the respective pawls and ratchet wheels and under this condition rotary motion of the input shaft in either direction causes the output drum to rotate synchronously therewith in the same direction. Rotation of the output drum is in turn conveyed to a utilization means by a cable (not shown) wound around grooves 35 in the drum.

Input drum 33 also normally rotates in accordance with the motion of the input shaft as a result of coupling between the input and output drums. This coupling is provided by disengage pins 34 and 36 and adjustable stops 37 and 38, the pins being attached to pawls 24 and 26, respectively, and the stops being attached to the input drum. Hence, if output drum 23 is rotating in a clockwise direction, as viewed in FIG. 3, input drum 33 will rotate in the same direction by virtue of disengage pin 34 being in contact with stop 37. Likewise, when the output drum rotates in the opposite direction, disengage pin 36 contacts stop 38 to drive the output drum in a counterclockwise direction. In both of these cases, the reactive forces exerted by the stops against the mating disengage pins are not sufficient to rotate the pawls about their pivot shafts so they do not disengage from the ratchet wheels.

Input drum 33 is also operative for disengaging the output drum from the input shaft. This enables the output drum to be driven in accordance with independent motion imparted to the input drum. For instance, assume that the input drum is rotated in a clockwise direction by means of a cable (not shown) wound around grooves 39 in the drum. Alternatively, the input drum may be rotated by a lever attached directly thereto as would be the case for an aircraft throttle control clutch mounted on the cockpit pedestal. The initial incremental rotation of the input drum causes stop 38 to move into contact with disengage pin 36 and rotate pawl 26 clockwise about its pivot shaft 28, thereby disengaging the pawl from ratchet wheel 18. At the same time, lifter pin 41 affixed to pawl 24 is contacted by surface 42 of stop 37 causing the pawl to rotate counterclockwise about its pivot shaft 27 and become disengaged from ratchet wheel 17. In this condition, planetary gear 10 is free to rotate with the sun gear and input shaft but the motion is not coupled to output drum 23. Further clockwise rotation of the input drum causes disengage pin 36 to drive pawl 26 against pawl stop 43 affixed to the output drum with the result that the input and output drums rotate in synchronism. In a similar manner, if the input drum is independently rotated in a counterclockwise direction, disengage pin 34 is driven by stop 37 to lift pawl 24 from ratchet wheel 17 and drive it against pawl stop 44 while lifter pin 46, attached to pawl 26, is contacted by surface 47 on stop 38 to lift pawl 26 from ratchet wheel 18, thereby enabling the input drum to drive the output drum in a counterclockwise direction. It should be noted that the various disengage and lifter pins pass through slots 48 large enough to enable the pins to move sufficiently far to rotate the pawls out of engagement with the ratchet wheels and into contact with the pawl stops. In addition, the relative positions of the disengage and lifter pins must be precisely adjusted with respect to stops 37 and 38 to assure that stop 38 contacts disenage pin 36 but not lifter pin 46 in the case of clockwise rotation and, likewise, that stop 37 contacts disengage pin 34 but not lifter pin 41 in the case of counterclockwise rotation.

Figure 4:
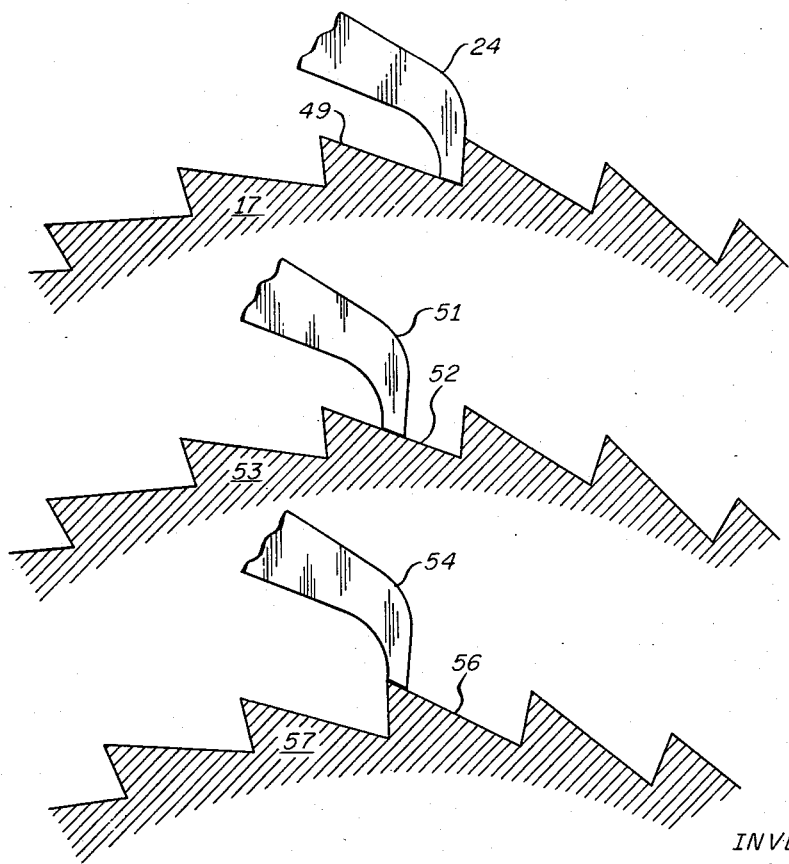
FIG. 4 is a schematic which is useful for explaining the arrangement of the respective ratchet pairs for increasing the resolution of the clutch apparatus of FIG. 1.

The resolution of the clutch can be increased by arranging the ratchet wheels with respect to their pawls in the manner illustrated in FIG. 4 wherein the individual wheels which are operative for clockwise rotation of the input shaft (counterclockwise rotation of the ratchet wheels) are oriented such that the pawls strike different points on the teeth of the respective ratchets at any given instant. Hence, for the position of the ratchets shown in the figure, when pawl 24 is in full engagement with tooth 49 on wheel 18, pawl 51 is at the mid position of tooth 52 on wheel 53 and pawl 54 is only beginning to move onto tooth 56 on wheel 57. The ratchet mechanisms which are operative for the opposite direction of rotation are similarly disposed relative to one another. This design increases the resolution of the clutch by a factor of 3 for a given tooth width 58 but it requires that the individual planetary gears and ratchets be made strong enough to carry the full load transmitted by the input shaft to the output drum.

As indicated in FIG. 1, an additional clutch 59, or clutches, can be mounted on the input drive shaft, if desired, and as previously mentioned, the input drums of the additional clutches can be separately controlled to disconnect the respective output drums from the input shaft.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A dual control clutch mechanism comprising
an output member having rigidly mounted pawl stops;
a first input member for driving the output member;
disengageable connecting means normally coupling the first input member to the output member;
said disengageable means including a sun gear attached to the first input member, planet gear means in mesh with the sun gear and connected to the output member, and a pair of contradirectionally operative ratchet mechanisms disposed to operate in conjunction with the sun gear and planet gear means for effecting engagement and disengagement between the first input member and the output member; and
a second input member coupled to the output member and including means for actuating the disengageable means to disconnect the output member from the first input member.

2. The apparatus of claim 1 wherein each ratchet mechanism comprises a ratchet wheel connected to the planet gear means and a pawl which is connected to the output member and is movable in and out of contact with the ratchet wheel.

3. The apparatus of claim 2 wherein the means for actuating the disengageable means includes stops rigidly attached to the second input member, said stops being operative in conjunction with pins attached to the pawls for moving the pawls out of contact with their corresponding ratchet wheels and into contact with a related pawl stop when an overriding driving force is applied to the second input member.

4. The apparatus of claim 2 wherein the second input member is coupled to the output member by stops rigidly attached to the second input member operating in conjunction with disengage and lifter pins affixed to the pawls, a disengage pin of one pawl and a lifter pin of the other pawl acting to move the respective pawls out of contact with their corresponding ratchet wheels for one direction of overriding rotation of the second input member and a disengage pin of said other pawl and a lifter pin of said one pawl acting likewise for the opposite direction of overriding rotation of the second input member.

5. The apparatus of claim 2 and further including additional planet gear means equiangularly disposed about the sun gear in mesh therewith and associated contradirectionally operative ratchet mechanisms, each including a ratchet wheel connected to related planet gear means and a pawl connected to the output member and movable in and out of contact with the ratchet wheel.

6. The apparatus of claim 5 wherein the pawls effective for precluding rotation of the ratchet wheels in each direction are disposed relative to the ratchet teeth such that when one pawl is in full engagement with a ratchet tooth the other pawls are in successive degrees of partial engagement with a tooth on their related ratchet wheels, thereby increasing the resolution of the apparatus in accordance with the number of planet gears and ratchet mechanisms employed.

7. The apparatus of claim 1 wherein each ratchet mechanism comprises a ratchet wheel and a pawl, the latter being connected to the output member and movable in and out of contact with the ratchet wheel which is mounted for rotation with said planet gear means.

8. The apparatus of claim 7 wherein the means for actuating the disengageable means includes stop members rigidly attached to the second input member, said stop members being operative in conjunction with pawl contacting members for moving the pawls out of contact with their corresponding ratchet wheels and into contact with a related pawl stop when an overriding rotation force is applied to the second input member.

9. The apparatus of claim 7 wherein the second input member is coupled to the output member by stop members rigidly attached to the second input member operating in conjunction with disengage and lifter members contacting the pawls, a disengage member of one pawl and a lifter member of the other pawl acting to move the respective pawls out of contact with their corresponding ratchet wheels for one direction of overriding rotation of the second input member and a disengage member of said other pawl and a lifter member of said one pawl acting likewise for the opposite direction of overriding rotation of the second input member.

References Cited

UNITED STATES PATENTS

| | | | |
|---|---|---|---|
| 2,394,384 | 2/1946 | Horstmann | 74—625 |
| 2,420,552 | 5/1947 | Morrill | 74—626 |
| 3,363,480 | 1/1968 | Murphy | 74—626 |

ARTHUR T. McKEON, Primary Examiner

U.S. Cl. X.R.

74—665